(12) United States Patent
Otto

(10) Patent No.: US 11,617,434 B2
(45) Date of Patent: Apr. 4, 2023

(54) DOCUMENT HOLDER WITH HORIZONTALLY DISPLACEABLE FILE SUPPORT

(71) Applicant: Björn Michael Otto, Munich (DE)

(72) Inventor: Björn Michael Otto, Munich (DE)

(*) Notice: Subject to any disclaimer, the term of this patent is extended or adjusted under 35 U.S.C. 154(b) by 36 days.

(21) Appl. No.: 17/314,091

(22) Filed: May 7, 2021

(65) Prior Publication Data
US 2021/0259405 A1  Aug. 26, 2021

Related U.S. Application Data

(63) Continuation of application No. PCT/EP2019/080194, filed on Nov. 5, 2019.

(30) Foreign Application Priority Data

Dec. 19, 2018 (DE) .................. 10 2018 222 308.4

(51) Int. Cl.
*A47B 23/00* (2006.01)
*A47B 23/04* (2006.01)
*A47B 23/06* (2006.01)

(52) U.S. Cl.
CPC ............ *A47B 23/043* (2013.01); *A47B 23/06* (2013.01); *A47B 23/00* (2013.01); *A47B 23/04* (2013.01)

(58) Field of Classification Search
CPC ..... A47B 23/043; A47B 23/042; A47B 23/06; A47B 23/04; A47B 23/00; A47B 23/007; A47B 2023/049; A47B 2023/008
USPC ......................... 248/454, 455, 456, 458, 460
See application file for complete search history.

(56) References Cited

U.S. PATENT DOCUMENTS

| | | | | |
|---|---|---|---|---|
| 362,741 A | * | 5/1887 | Hansen .................. | A47B 23/04 248/446 |
| 1,401,458 A | * | 12/1921 | Boon ..................... | A47B 27/02 248/456 |
| 1,790,487 A | * | 1/1931 | Ruhnau ............... | A47B 23/042 248/451 |

(Continued)

FOREIGN PATENT DOCUMENTS

| | | |
|---|---|---|
| DE | 866944 C | 2/1953 |
| NL | 1004271 C1 | 4/1998 |

(Continued)

OTHER PUBLICATIONS

Docuglide Plus—fm Kunststofftechnik GmbH, Product Overview, 4 pages, retrieved on Apr. 28, 2021, https://fm-kunststofftechnik.de/kompetenzen/eigenprodukte/docuglide_plus.php.

(Continued)

*Primary Examiner* — Nkeisha Smith
(74) *Attorney, Agent, or Firm* — United One Law Group LLC; Kongsik Kim; Jhongwoo Peck

(57) ABSTRACT

The present invention comprises an apparatus (1) for arranging a file (2) above a keyboard (4) which is located on a desk (3) comprising a base (5), a slide (6) and an inclined support (7) for supporting the file (2), wherein the support (7) is mounted on the slide (6) and the base (5) is adapted to be arranged on the desk (3) and/or on the keyboard (4) and to guide the inclined support (7) above the keyboard (4) during a horizontal motion of the slide with respect to the base (5) from a front position to a back position, wherein an arrestor is provided in the front position.

17 Claims, 9 Drawing Sheets

(56) References Cited

U.S. PATENT DOCUMENTS

| | | | | |
|---|---|---|---|---|
| 1,797,889 A * | 3/1931 | Wiberg | A47B 23/043 | 248/454 |
| 1,875,288 A * | 8/1932 | Welk et al. | A47B 23/043 | 211/43 |
| 2,691,239 A * | 10/1954 | McCollum | A47B 23/043 | 248/444 |
| 2,721,417 A * | 10/1955 | Dickinson | A47B 23/04 | 248/453 |
| 2,730,422 A * | 1/1956 | Holmberg | A47B 23/046 | 312/316 |
| 4,116,413 A * | 9/1978 | Andersen | A47B 23/043 | 248/451 |
| 4,163,497 A * | 8/1979 | McEwen | B42F 17/12 | 211/11 |
| 4,441,432 A * | 4/1984 | Carlton | A47B 37/02 | 108/139 |
| 4,776,552 A * | 10/1988 | March | A47B 23/044 | 248/455 |
| 4,844,644 A * | 7/1989 | Roberts | A47B 23/042 | 402/70 |
| 4,896,252 A * | 1/1990 | Stewart | A47B 23/043 | 248/446 |
| 4,978,096 A * | 12/1990 | Struckmann | A47B 23/043 | 24/18 |
| 5,484,124 A * | 1/1996 | Billings | A61F 4/00 | 248/118 |
| 5,649,683 A * | 7/1997 | Ahn | A47B 23/042 | 248/453 |
| 8,651,445 B2 * | 2/2014 | Lee | A47B 23/043 | 248/454 |
| 9,474,379 B1 * | 10/2016 | Villasuso | A47C 7/68 | |
| 10,631,633 B1 * | 4/2020 | Holmes | A47B 23/002 | |
| 11,039,689 B1 * | 6/2021 | Voltz | A47B 23/04 | |
| 2015/0115125 A1 * | 4/2015 | Hou | A47B 23/043 | 248/454 |
| 2017/0065077 A1 * | 3/2017 | Behroozi | F16M 11/2085 | |
| 2021/0212425 A1 * | 7/2021 | Wang | A45C 7/02 | |

FOREIGN PATENT DOCUMENTS

| | | |
|---|---|---|
| NL | 1020851 C2 | 12/2003 |
| WO | 02082948 A1 | 10/2002 |

OTHER PUBLICATIONS

VUR 59GR—Vu Ryte Inc, Product Overview, 4 pages, retrieved https://vu-ryte.com/product/vur-59gr.com on Apr. 28, 2021.

* cited by examiner

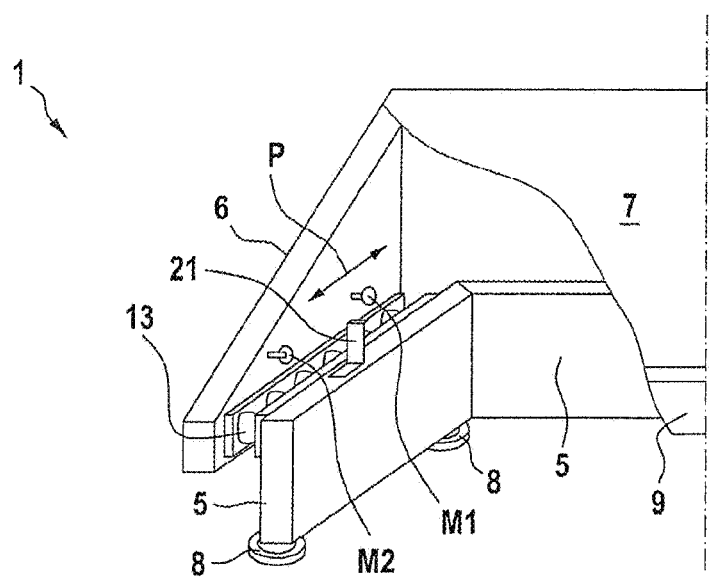

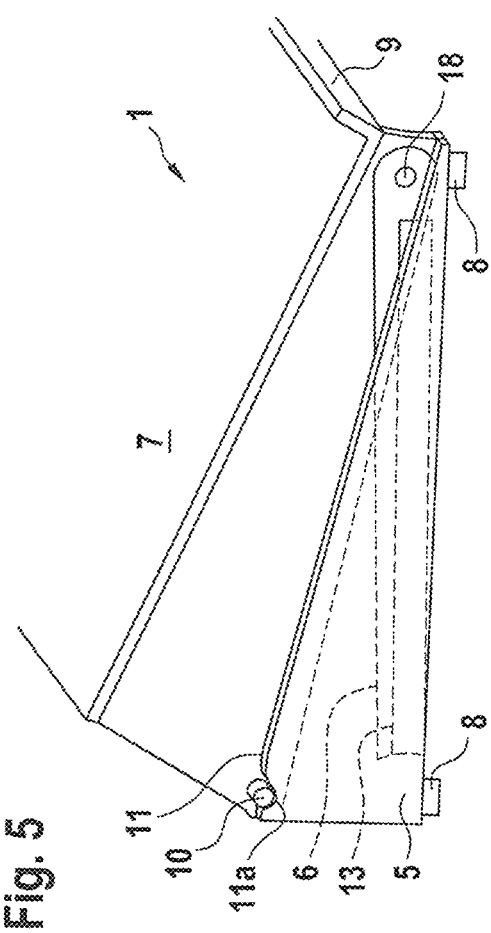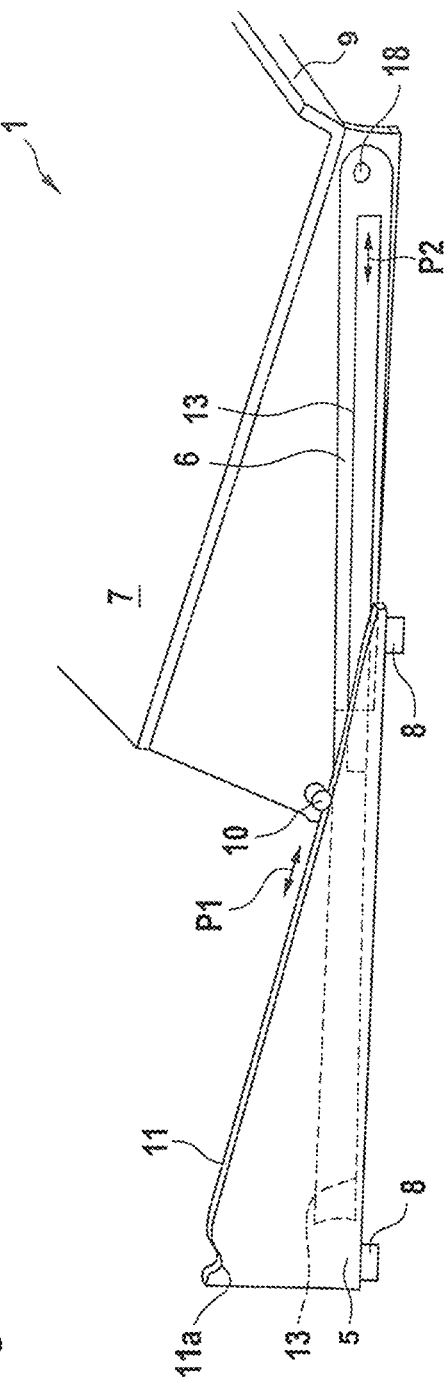

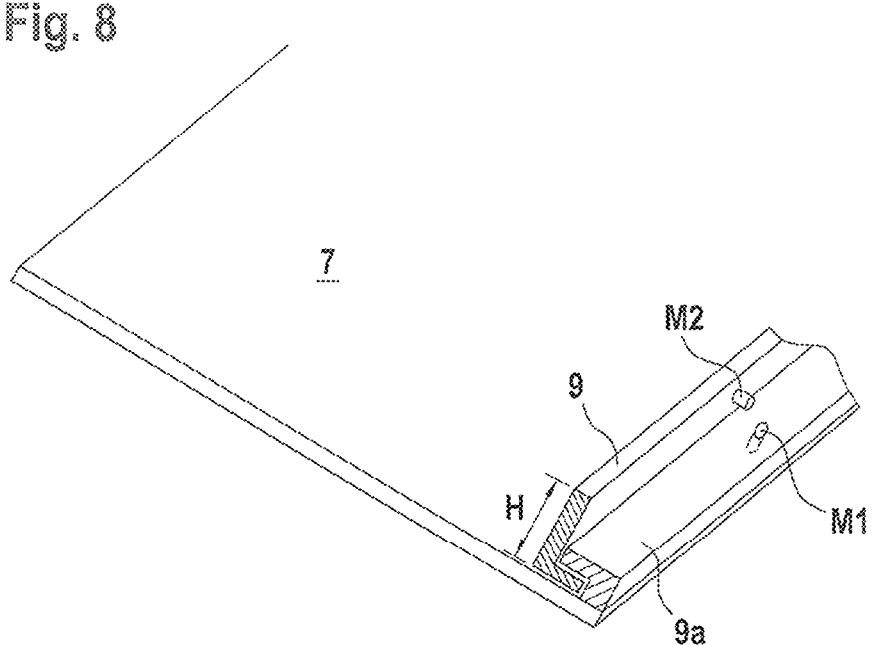
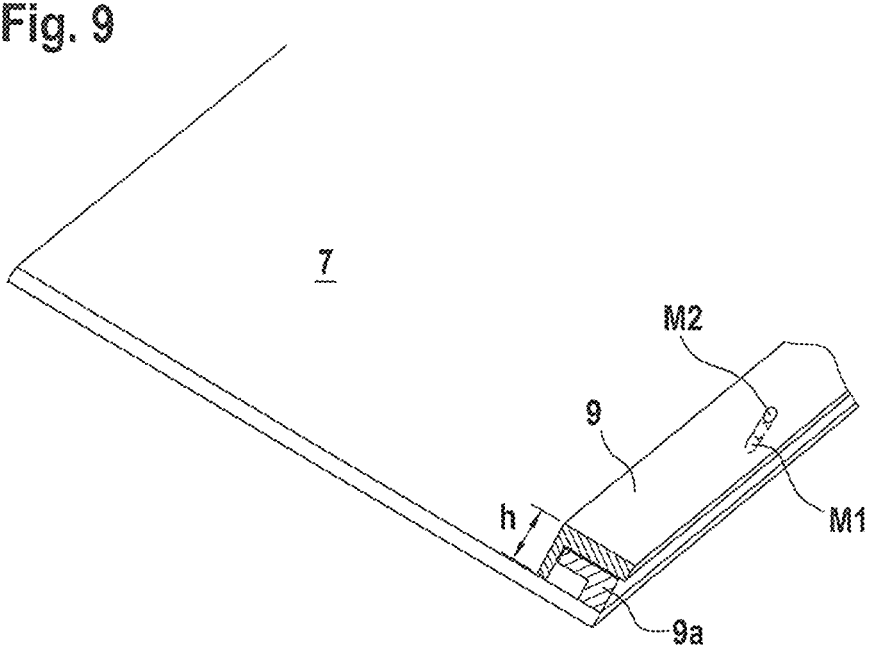

DOCUMENT HOLDER WITH HORIZONTALLY DISPLACEABLE FILE SUPPORT

CROSS-REFERENCE TO RELATED APPLICATIONS

The application is a continuation application of International Application No. PCT/EP2019/080194 filed on Nov. 5, 2019, which claims priority to German Application No. 10 2018 222 308.4 filed on Dec. 19, 2018. The applications are incorporated herein by reference in their entireties.

TECHNICAL FIELD

The present invention relates to an apparatus for arranging a file above the keyboard, which is located on a desk. In particular the present invention is related to ergonomic improvements when handling templates and files at a desk.

BACKGROUND ART

Copyholders are used at desks in order to arrange paper work which is to correct or to transcribe, in an ergonomic position, in which the typist can view the paper work and correct its content, if necessary, in a best possible ergonomic manner. Commonly, copy holders are thus arranged next to the keyboard or between the keyboard and the monitor of the computer work station. Since the keyboard is arranged at the front edge of the desk in order to facilitate ergonomic posture, the typist has to lean forward over the keyboard, in order to scroll within the document or take correcting notes in the document, for example. If the copy holder is arranged next to the keyboard, the distance between the document and the typist may be reduced. However, viewing the document results in a torsion of the upper body or the cervical spine, which promotes headache and neck pain.

WO 02/082948 A1 and DE 866 944 C show apparatuses, by means of which computer work stations can be provided.

https://fm-kunststofftechnik.de/kompetenzen/eigen-produkte/docuglideplus.php discloses a copy holder called "DOCUGLIDE", which comprises an inclined file support. If the copy holder is arranged between the monitor and the keyboard, the inclined file support facilitates positioning the template above the keyboard since a base body provides an inclined guidance of a file support. A pen repository within the base body is uncovered, if the typist pulls the file support near with respect to the base body. By the inclined guidance of the file support among known copy holders, the template in a back position (closer to the monitor) higher than in a front position when pulled forward. Hereby, the monitor has to be set up into a higher position than necessary, in order not to (partially) obstruct the monitor, which results in a reduced number of degrees of freedom for providing better ergonomics of the computer work station. Moreover, many copy holders are not meant to be used with heavy paper files as handled in (patent-) law firms, government agencies, at court and elsewhere.

SUMMARY OF THE DISCLOSURE

It is an object of the present invention to reduce or overcome the aforementioned drawbacks of the prior art.

Embodiments of the present invention provides an apparatus for arranging a file above a keyboard which is located on a desk. The apparatus comprises a base, a slide, and an inclined support for supporting the file. The support is mounted on the slide. The base is adapted to be arranged on the desk and/or on the keyboard and to guide the inclined support above the keyboard during a horizontal motion of the slide with respect to the base from a back position to a front position and vice versa. An arrestor is provided in the front position or in the back position, and/or a guide rail is provided between the base and the slide for guiding the horizontal motion.

The slide may be slidably attached to or on the base. The base may have—at least in part—an anti-slip-lower surface. The support may provide an inclined plane and/or an adjustable inclination with respect to the slide. The support may comprise a mechanical stop which is arranged to secure the file on the support. The mechanical stop may have an adjustable height and/or is replaceable and/or rotatable.

The apparatus may further comprise a position member arranged for a dynamic adjustment of an inclination of the support by at least partially raising the support depending on a position of the slide with respect to the base, in particular by sliding or rolling on a crank of the base.

The base may be designed and arranged in order to protrude with respect to the support at a front end before the horizontal motion and not to protrude anymore with respect to the support at the front end after the horizontal motion.

The support may comprise an extension which—in particular asymmetrically—extends perpendicularly with respect to a direction of the horizontal motion beyond the base and/or which is arranged to swing out or to be pushed in this direction.

The above and other embodiments of the present invention will be described in more detail below.

BRIEF DESCRIPTION OF DRAWINGS

The features, combination of features and advantages of the present invention are further illustrated by means of the accompanying figures.

FIG. 4 is a perspective detailed view on a suspension of the slide above a base.

FIG. 5 is a perspective side view at an embodiment of the apparatus according to the present invention for facilitating a dynamic adjustment of an inclination of the support in a rear position.

FIG. 6 is a perspective side view at an embodiment of the apparatus according to the present invention for facilitating a dynamic adjustment of an inclination of the support in a front position.

FIG. 8 is a first embodiment of a height adjustable mechanical stop at the front edge of the support in a first position.

FIG. 9 is a first embodiment of a height adjustable mechanical stop at the front edge of the support in a second position.

DETAILED DESCRIPTION

Figure 1:
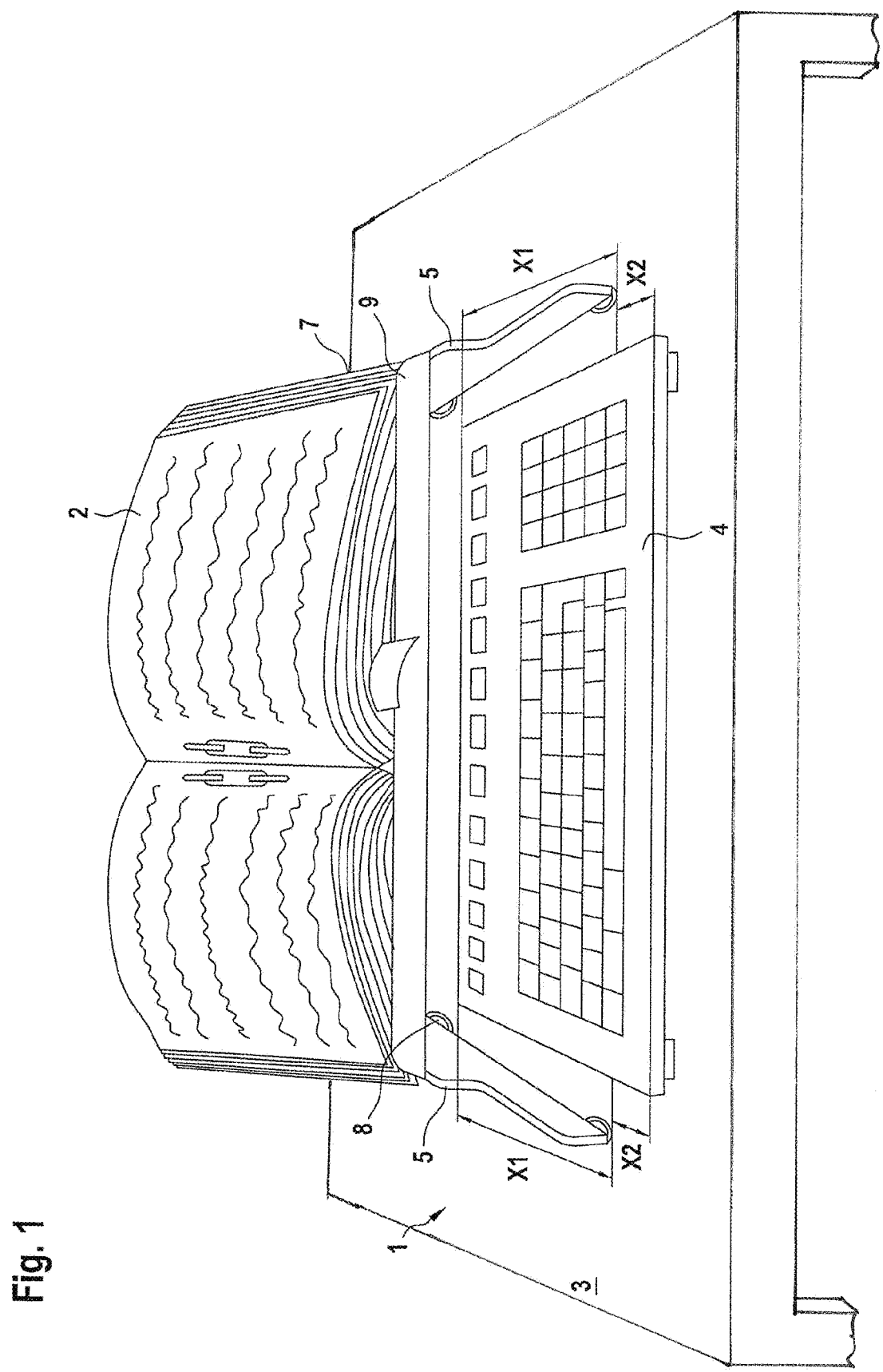
FIG. 1 is a perspective depiction of an embodiment of the copy holder according to an embodiment of the present invention.

The solution to the aforementioned object is defined in the independent claims. The dependent claims define advantageous embodiments of the invention. Accordingly, the aforementioned object is solved by the present invention by an apparatus for arranging a file above a keyboard located on a desk. The device may be named "file butler", "file drawer" or "copy holder". It is meant for temporarily arranging the file above a keyboard, if the file is to be handled (e.g. correcting, scrolling, filing paper work away, taking notes or stamping paper work). As soon as the keyboard on the desk is to be used, e.g. in order to enter terms, edit electronic documents and the like, the apparatus can be used, in order to arrange the file behind the keyboard or between the keyboard and the monitor, respectively. Therefore, the apparatus comprises a base arranged on the desk and in particular fixed on the desk. Therefore, a temporary fixation of the base by means of screws, clamps, and the like is possible. Alternatively or in addition the base may be arranged and optionally attached to the keyboard or on the keyboard. Moreover, a slide is provided which facilitates a horizontal slide with respect to the base. A file support for receiving the file is mounted at or on the slide, respectively. In this manner, the file support can be guided horizontally by the slide. The slide itself can slide or cast on the desk and/or be carried by the base. In other words, the base guides the horizontal motion of the slide, which in turn guides the file support horizontally. Hereby, the file support is arranged such, that it slides above the keyboard. In other words, the clearance between a lower side of the base and the lower side of the file support or between the desk top surface and the file support is always sufficient for arranging a common keyboard, independently of the position of the slide. In particular, three to six centimeters of clearance are to be provided. The slide or the file support, respectively, by means of the base, can thus either be moved towards the monitor (back position) or towards the keyboard or the typist (front position), without requiring a reasonable effort or requiring the typist to guide the file or the file support/slide, respectively. In this manner, a one handed and eccentric force with a horizontal component exerted on the slide/the file support can bring the file in the front position or the back position, respectively. In particular, in the front position and/or in the back position, arrestors can be provided. In other words, the slide remains in the front position or the back position, respectively, if not receiving a minimum force being higher than a sliding friction for moving the slide between both positions. Ideally, a short push to the file support/the file/the slide is sufficient in order to change between the front position and the back position. A transition of positions of the file can thus be performed in a time efficient and ergonomic manner.

The dependent claims show advantageous embodiments of the invention.

Advantageously, the slide can be slidably fixed to or on the base. In other words, a guide rail or a roll mechanism is provided between the slide and the base, in order to take the normal forces, which the slide is exposed to and to protect the surface of the desk. Preferably, ball bearing move-outs or guide rails can be applied in order to support the slide at the base. Such, the base remains stationary on the surface of the desk, while the slide leads all normal forces into the base instead of the surface of the desk.

The base can comprise an anti-slip lower surface, at least partially. In particular, rubber elements or suction cup-style features have proven to be appropriate add-ons to the lower side of the base.

However, the base can also be connected to the surface of the desk or fixed to the surface of the desk in any other manner, in particular force-fit or form-fit. For example, bores and/or screw loops can be provided, by means of which the base can be screwed to the surface of the desk. The screw loops can also be part of an angular metal part, which embraces the edge of the desk and facilitates screwing to the lower side of the desk top.

Further preferably a magnet can be sunk to the desk top and/or be attached to the base. In this way, a magnetic fixation of the base to the surface of the desk top is provided. Alternatively or in addition, a hook-and-loop fastener can establish an anti-slip-lock. By establishing an anti-slip fixation of the base to the surface of the desk an unintended displacement of the base can be prevented, even if heavy files are carelessly pushed from the front position into the rear position or vice versa.

The file support can facilitate arranging a file at an inclined angle with respect to the direction of the movement. In other words, the file support can provide an inclined plane, on which the file can rest. For this, the slide can facilitate an inclined arrangement of the (plane) file support. The slide can be wedge-shaped, such that the normal of the file support is inclined into the direction of the typist or the front position, respectively. It goes without saying that an additional member may be provided between the slide and the file support which provides these and/or other functions discussed further below. As a result, the at least partially horizontal motion of the slide and at the same time an inclined surface of the file support are facilitated.

In particular, the file support can have an adjustable inclination with respect to the slide. In other words, the inclination of the file support with respect to the horizontal can be adjusted stepless or stepwise. To this, a crank provided on the slide can engage a corresponding structure, which is provided at the file support, in a form-fit or force-fit manner in different configurations. Alternatively or in addition a crank can be provided at the file support, of course. For example, a pin can be pushed through the slide or the file support on one hand and the corresponding crank, respectively, at different positions, wherein the file support rests on the pin at different inclinations depending on the position of the pin. The pin can be embodied by a threaded bolt and can be secured by a nut or wing nut.

An edge of the file support facing the typist or the front position, respectively, can be provided with a stop being configured to secure the file on the file support. In other words, the file is prevented from slipping off the file support due to the inclination of the file support. Depending on the implementation of the file support the stop can be part of the file support or a separate component. For example, if the file support is made from acrylic/plastic material, the stop can be generated by forming the file support in a direction of the normal of its upper surface. In addition or alternatively, screw fitting and/or glued connection and the like can attach the stop on the file support. The same applies to a base of the stop, on which the actual base can temporarily or permanently be fixed to.

In particular, the stop can be height adjustable and/or exchangeable and/or rotatable in order to facilitate the sufficiently secure support for templates/files of different thicknesses on the one hand and best possible ergonomics for the typist when handling the template/file, for example when scrolling, on the other hand. For example, the stop can facilitate two different heights by clipping a strip on the base of the stop or to detract the strip off of the base of the stop. Alternatively, a strip of the stop may comprise a scalene L-profile, so that the orientation of the strip of the stop with respect to the base of the stop or the file support, respectively, decides on the effective height of the stop. A rotation of the strip of the stop can for example be guided by an axle. Magnets in the strip of the stop on one hand and/or within the file support for the base of the stop, respectively, can be provided in order to temporarily fix the strip of the stop in its position.

A stepless variation of the height of the stop can be realized for example by providing an elongated hole in the strip of the stop, through which a threaded bolt protrudes, which is attached to the file support and is fixed to the strip of the stop by means of a wing nut or the like. Alternatively, the strip of the stop can comprise two separate elements/parts. Each part can be arranged rotatably at the front edge of the file support. If the respective end opposite to the hinge is lifted from the file support or the base of the stop, respectively, this results in a greater height with respect to the surface of the file support which is advantageous for receiving thick files. The respective hinge can be arranged at an eccentric position or at the outer edges of the two parts of the strip of the stop. When lifting the ends of the two parts arranged in the center, this results in a gable-like outline for the stop, which matches the height profile of the front edge of an open file while not interfering when scrolling. Between the two parts of the strip of the stop a fix and stationary element can be provided (for example at the base of the stop). In combination with the two parts of the strip of the stop, it preferably forms a substantially continuous stopping surface strip of the stop, respectively, while after lifting both movable parts of the strip of the stop it prevents a middle part of a file being arranged on the apparatus to slip in the direction of the base of the stop or the typist, respectively, which otherwise would prevent both movable parts of the strip of the stop from being brought into a lower starting position. An adjustable (e.g. displaceable) spacer between the surface of the file support and the strip of the stop can be provided an order to facilitate a very stable positioning of the rotatably hinged (parts of the) strip of the stop. This spacer can be provided for each of the rotatable parts of the strip of the stop. The closer this spacer is brought to the hinge, the higher the opposite end of the strip will be lifted. In order for the spacer to be fixed in its position, it can be attached to the strip of the stop or the base of the stop, respectively, at or in different positions. For example this can involve a step profile at the strip of the stop and/or a plurality of notches in the base of the stop, which are engaged by the spacer. Alternatively or additionally a (stepless or stepwise) magnetic fixation of the spacer (which may comprise a permanent magnet or the like) at the ferromagnetic base of the stop or the ferromagnetic strip of the stop, respectively, is possible.

Sometimes, it may be advantageous to vary the inclination of the file support between the frontmost position and the backmost position, in order to always provide a rectangular view on the paper/file. In other words, having a smaller inclination of the file support with respect to the horizontal in the frontmost position and having a higher inclination of the file support with respect to the horizontal in the backmost position can be advantageous. Manually varying the inclination of the file support, as described above, in principal is possible, however, non-ergonomic/non-economical. Thus, a control element can be provided which is arranged for selectively and/or configurable dynamic adjustment of the inclination of the file support. Therefore, the control element can at least partially lift the file support depending on the position of the slide with respect to the base and in this manner incline the file support (a horizontal translation in combination with the rotation of the file support). The control element can be embodied as a pin, a roller and the like and may glide or coast on a crank of the base. In other words, the base may have a crank which is inclined with respect to the horizontal, which is engaged by the control element or on which the control element runs or rests. Since the control element is attached to the slide or the file support, the control element is moved upwards and downwards on the inclined crank, when the slide is shifted horizontally, such that the file support is tilted correspondingly. In particular, the control element can herefore lift the front edge or the rear edge of the file support, if the slide is brought into the backmost position (and vice versa).

As described herein, a horizontal motion can be a momentary state, which the slide runs through. In order to do so, a front part of the slide can engage a crank of a first inclination and a rear part of the slide can run in a crank of a second inclination, which particularly is in an opposed direction with respect to the first inclination. In this manner a horizontal displacement is always superimposed to a rotation of the slide and the inclined file support.

Arranging an (optionally single) crank substantially centered between a left and a right end of the base underneath the file support has the advantage that a single roll as a control element, which is mounted centered underneath the file support can roll on the crank and induce the load of the file centrally into the crank. As a matter of kinematic reversion, the crank can be attached to the file support and/or to the slide and cost on a stationary and fixed roller.

Due to the kinematic between the control element and the crank resting positions can be realized, in which the weight of the file support and the additional mass of the paper/file presses the control element into a notch or a groove, as soon as the slide has reached the frontmost position and/or the backmost position. Of course, the crank can also be designed such, that the inclination of the file support with respect to the horizontal reaches a maximum in the frontmost position and reaches a minimum in the backmost position. For example, this can be advantageous if the monitor shows a small clearance with respect to the desk top surface. In this manner, the file support is ideally inclined in order to work on the file in the frontmost position, while revealing the view on the monitor in the backmost position. In addition, this arrangement can be advantageous, if the file is not to be viewed in the backmost position at all. In contrast, the inclined configuration of the file support is only established, as soon as the slide is in the frontmost position and thus the file is arranged above the keyboard.

The control element can for example be activated or deactivated, such that engagement with the crank of the base is established or prevented. For example, a pin as the control element can be removed from the file support or from a part of the slide, respectively, if a dynamic adjustment of the inclination is not required and be re-introduced, as soon as a dynamic adjustment of the inclination of the file support is required. In addition, several different cranks showing different inclinations and/or orientations can be provided.

Depending on the position of the pin (fully introduced or in a semi-position) or a location of the pin (for example in a left or a right edge or protrusion part) of the base and the respectively associated crank) a different dynamic of the amendment of the inclination between the frontmost position and the rearmost position of the slide is realized. Preferably, the crank can comprise a rail, which can engage the crank base body in different positions, the crank base body having a substantially vertical side wall. Therefore, the rail can preferably comprise pins or similar structures, which engage the crank base body at predefined positions. It is proven to be advantageous, that at least one pin at a first end of the rail comprises a thread in order to facilitate fixing it in a bore in the crank base body. The second pin located at an opposite second end of the pin does not need to comprise a thread since only being adapted to define the height of the rail. In this manner an accidental disengagement between the rail and the crank base body can be prevented. A similar purpose is served if the rail is pressed towards the crank base body by an elastic element (for example a rubber band), which penetrates the crank base body and is fixed at a side of the crank base body opposite to the rail, and which fixes the engagement of the two pins, none of which has to comprise a thread now.

A quick and ergonomic adjustment of the inclination of the rail can be facilitated by two pins of different lengths, wherein the rearmost pin is shorter and disengages the crank base body in the course of pulling the rail sideward, while the front most, longer pin still engages the crank base body. Therefore, the rail can be drawn from the crank base body by means of a rod, which is attached to a side of the rail opposite to the crank base body, such that at least one of the pins loses engagement with the crank base body such that the rail can be pivoted around the other pin. If the rod is now pushed towards the crank base body again, the shorter pin can engage a different bore in the crank base body in order to fix the rail to the crank base body in a different position.

The rail can comprise an angular metal sheet or a hollow profile. In particular, it can be made from plastic or metal, in particular aluminum. The pins may bet threaded bolts which stick out through the rail.

In order to facilitated adapting the intensity of the arresting positions to the user's needs, the rail can comprise a threaded bolt at one end, the height of which can be adjusted by a thread with respect to the wheeling surface. A wheel rolling on the rail dives onto the screw at the end of the rail deeper or less deep, by means of which the arresting force against its return to the wheeling surface is increased or decreased. A similar effect can be provided by a structure which can be introduced into the end of the rail, which is embodied as a hollow profile and which structure comprises a groove in which the wheel rests at the end of the displacement of the slide. By replacement or modification (grinding or inserting a filler material such as felt) the user can easily adjust the depth of the arrestor.

The wheeling surface can be provided with a thin, soft layer, in particular felt, in order to reduce operating noise.

In order to prevent the apparatus from tilting onto the keyboard or into the direction of the typist, respectively, if heavy stacks of paper/thick files are handled, the base body can be designed and arranged such that it protrudes from the support at the front before the displacement and (optionally) does not any more protrude with respect from the support after the displacement. In other words, the base can be designed such that it accommodates the keyboard at least partially between a left edge and a right edge (or protrusion part). Next to the keyboard, preferably at both sides, components ("protrusion parts") of the base are located, by means of which the forces of the apparatus (including the file), which is arranged above the keyboard, are introduced into the desk top surface with no remaining free momentums. These components of the base should be designed as flat as possible in order not to compromise the ergonomics when using the keyboard (in this configuration the slide usually is located in the rearmost position).

Depending on the tasks of the typist or clerk, respectively, it can be advantageous if the support is designed or arranged, respectively, in an asymmetric manner with respect to the base. In other words, if a keyboard is arranged centered in front of the typist, a base, slide etc. which are arranged centered in front of the clerk can support an eccentric support in order to provide an eccentric copy/file. This can be advantageous in particular if a certain workstation in particular an official part or client's part of a paper file is to be processed and from an ergonomic point of view this is to be arranged centered in front of the typist or over the keyboard, respectively. Therefore, the support can comprise a protrusion part, which protrudes with respect to the base at one side or is adapted for being unfolded, for being attached to or for being displaced with respect to the support at this side. In this manner, ergonomic working and a low volume of the apparatus in a stowed state is facilitated.

The components of the apparatus can be made from various appropriate materials. For example, wood (massive wood, plywood or veneered would particle board), aluminum, metal sheet, plastic, acrylic etc. can be used for manufacturing an apparatus according to the present invention. In particular transparent material has proven to be ergonomic and of aesthetic advantages, since areas of the desk arranged beyond can be reviewed, as long as no copy/file is arranged on the support.

Summarized, one idea according to the invention can be seen in that a horizontal displacement of the file is provided independently of an inclination of the support of a copy holder. In this manner, a space efficient arrangement of the file can be provided in the front position as well as in the rear position, such that the monitor does not have to be positioned higher than necessary, in order to ensure an unobstructed view at the screen. In contrast to known copy holders the present invention in particular provides the difference that the front edge of the file stands back from a front edge of the base in a rear position or protrudes with respect to a front edge of the base only by a couple of centimeters, if at all, in a front position, such that in both positions a secure stand of the apparatus is ensured.

The support of the apparatus according to the present invention in particular has a depth of at least 25 cm and a width of 35 cm. The mechanical stop has a height between 1.5 cm and 6 cm, in particular between 2.5 cm and 4 cm with respect to the surface of the support. For accommodating the keyboard, the base has a cavity of an inner width of at least 45 cm. Between the frontmost position and the rearmost position a guided displacement is provided of in particular at least 13 cm, preferably at least 16 cm, and a maximum of 20 cm to 25 cm. The maximum displacement of the slide can be adjusted by the user in a stepwise or stepless manner by mechanical stops arranged at the base. The mechanical stops may comprise arrestors and/or magnets or can interact with these elements in order to selectively latch the slide in the end positions.

Exemplary embodiments of the present invention will be described in more detail with the drawings.

FIG. 1 shows an embodiment of the apparatus 1 according to the present invention, on which a heavy file 2 as a copy is arranged. The inclined support 7 shows a mechanical stop 9 at its front edge, which prevents the file 2 from gliding off in a direction of the keyboard 4. The support 7 is mounted on a base 5 by means of a (non-depicted) slide, while between the left and the right protrusion part of the base 5 is sufficient space for accommodating the keyboard 4. The protrusion parts of the base 5 are flattened in the direction of the front position in order not to prevent ergonomic handling of the keyboard 4. The protrusion parts are partially located next to the keyboard 4 and show an overlap X1 with the keyboard 4 in the direction of view of the (non-depicted) typist. The front edges of the protrusion parts of the base 5 only stand back by distance X2 with respect to the front edge of the keyboard 4. In this manner, a secure stand of apparatus 1 is ensured even if the file 2 on the support 7 above the keyboard 4 is displaced into a front position. The base 5 is supported on the surface of the desk 3 by means of anti-slip rubber feet 8. The support 7 such as the mechanical stop 9 show a respective clearance with respect to the surface of the desk 3, such that the keyboard 4 can remain where it is, if the (non-depicted) slide displaces the file 2 or the support 7 and the mechanical stop 9, respectively, between the front position in the (depicted) back position.

Figure 2:
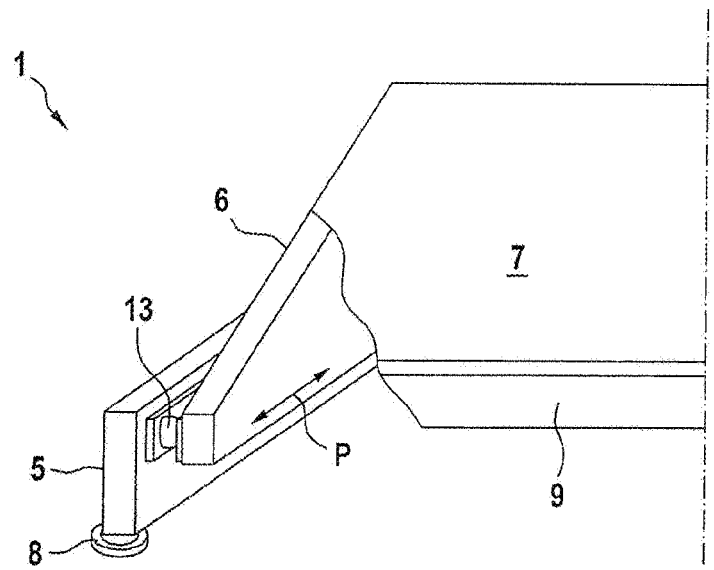
FIG. 2 is a perspective detailed view on a suspension of the slide at a base.

FIG. 2 shows a perspective detailed view of an embodiment of an apparatus 1 according to the present invention, in which the slide 6 is provided at an inner side of the base 5 by means of a ball bearing guide rail 13. As indicated by the double arrow P the slide 6 can be brought from a front position into a back position within the base 5 which comprises the slide 6. In the depicted embodiment it is important that the keyboard 4 (non-depicted) does not only have to fit between the protrusion parts of the base 5, but eventually also has to fit between the components of the slide 6, in order to facilitate an ergonomic displacement of the slide 6 above the keyboard 4. The guide rail 13 can provide arrestors by which end positions (front position and rear position) are defined.

Figure 3:
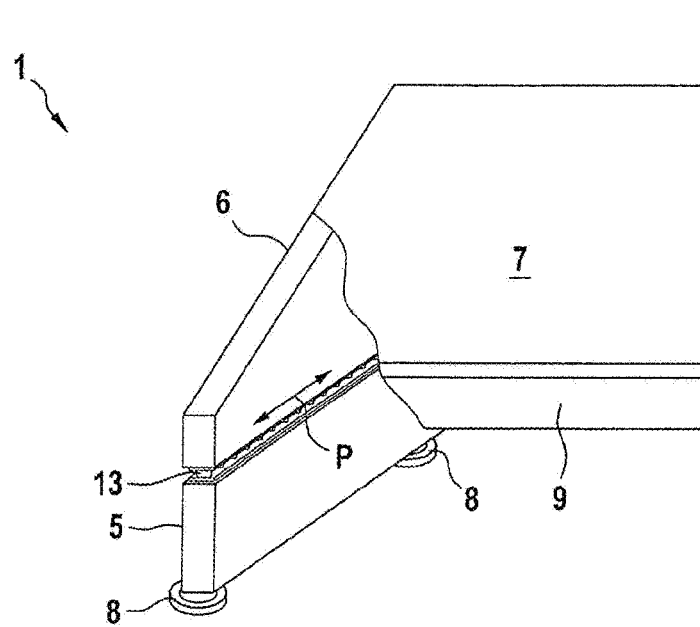
FIG. 3 is a perspective detailed view on a suspension of the slide on a base.

FIG. 3 shows an amended embodiment with respect to FIG. 2 in that the slide 6 is arranged above the base 5. Therefore, the guide rail 13 is arranged below the slide 6 and above the base 5. This facilitates an arrangement of the apparatus 1 according to the present invention having a relatively small width.

FIG. 4 shows an amended embodiment of the apparatus 1 according to the present invention with respect to the FIGS. 2 and 3 in that the slide 6 comprises (embraces) the base 5. In other words, the guide rail 13 is fixed at an inner side of the slide 6 and at an outer side of the base 5. This facilitates a relatively aesthetic visual appearance of apparatus 1. A front position and a rear position of the slide 6 on the base 5 are realized by means of an angular metal sheet 21, which is screwed to base 5, and two magnets M1, M2 which are fixed to slide 6. If the slide 6 is arranged in the front position, the magnet M1 adheres to the angular metal sheet 21 and thus provides a slide arrestor for the slide 6 in the front position. If the slide 6 is brought into the back position, the magnet M2 adheres to the angular metal sheet 21 and thus provides a light arrestor for the slide 6 in the back position. The skilled person recognizes that respective mechanisms can be contrarily embodied such that the magnets M1, M2 are fixed to base 5 and angular metal sheet 21 is slidably fixed to slide 6, without losing the function mentioned before. Alternatively, a respective angular metal sheet can provide the mechanical stop for a magnet arranged between these angular metal sheets. Beyond this, the depicted principal can be applied to every embodiment of the present disclosure.

FIG. 5 shows an embodiment of the apparatus 1 according to the present invention in which a dynamic adjustment of the inclination of a support 7 is provided by a pin 10 as a control element is attached to support 7. The pin 10 in the depicted position engages a notch 11a of a crank 11 at the upper side of base 5 and thus facilitates an arrestor in the back position of slide 6. The slide 6 is connected to the support 7 via a hinge 18. The slide 6 is horizontally displaced by a guide rail 13, which is screwed to base 5. A dynamic adjustment of inclination of support 7 is provided by the edge of support 7 located towards mechanical stop 9 being horizontally guided by the slide 6 and a rear edge of support 7 is additionally lifted by pin 10 and crank 11, as the slide 6 is pushed into the rear position.

FIG. 6 shows the embodiment depicted in FIG. 5, wherein the slide 6 and the support 7 are arranged in the front position. The pin 10 has left the notch 11a and has slided down crank 11. The inclination of support 7 has correspondingly decreased, such that a (non-depicted) typist maintains his or her identical viewing angle with respect to the surface of support 7. The angular displacement of pin 10 (as indicated by double arrow P1) in connection with the horizontal displacement of the slide 6 via the guide rail 13 according to double arrow P2 results in a partial rotation of support 7 around the hinge 18 in addition to the translation described in connection to FIGS. 1 to 4. If pin 10 is fully inserted into support 7, the support 7 can substantially maintain the inclination depicted in FIG. 6, if the slide 6 is brought into the rear position. Optionally, a second crank which shows a different contour than crank 11 can be arranged at the inner side of base 5 for supporting pin 10, such that different dynamics can be realized depending on a position and/or arrangement of pin 10.

Figure 7:
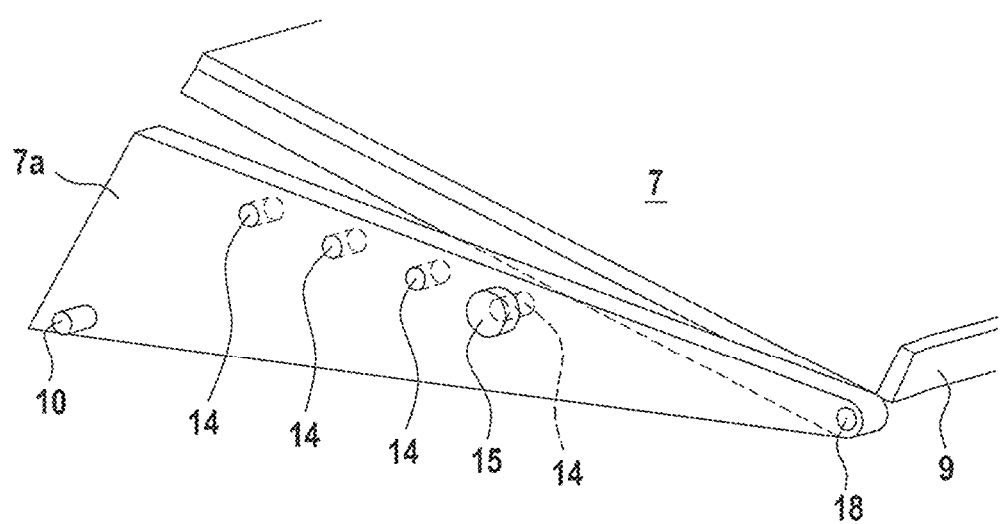
FIG. 7 is a perspective side view at a combination of a support and a slide for providing an adjustable inclination of the support.

FIG. 7 shows a perspective depiction of an embodiment of a combination from support 7 and support carrier 7a, wherein the latter could be understood as the dynamically adjustable portion of slide 6 corresponding to FIGS. 5 and 6. While the support 7 serves a static inclination of the (non-depicted) file with respect to support carrier 7a, the support carrier 7a via pin 10 as control element introduced in FIGS. 5 and 6 provides a dynamic inclination of the support 7 with respect to the (non-depicted) base. Via bores 14 and an additional pin 15 an inclination of support 7 with respect to support carrier 7a can be established. The closer pin 15 is introduced to the rear edge of support carrier 7a, the lesser is the static inclination of support 7. The support 7 is pivotally attached to the support carrier 7a by a hinge 18 in the region of mechanical stop 9. If the pin 10 is used in connection with the crank 11 of base 5 which is being depicted in FIGS. 5 and 6, a dynamic adjustment of the inclination superimposes with the static inclination which is defined by means of the pin 15 and the bores 14.

FIG. 8 shows an embodiment of a support 7 according to the present invention, which comprises a height adjustable mechanical stop 9. The mechanical stop 9 is embodied as an L-profile, the edges of which have different lengths. A short edge in the depicted position engages a notch in the catch base 9a, resulting in an entire height H of the stop, in the region of 4 cm. A first magnet M1 arranged in the catch base 9a and a second magnet M2 arranged in the mechanical stop 9 do not substantially interact in the depicted arrangement.

FIG. 9 shows the embodiment depicted in FIG. 8 after mechanical stop 9 has been withdrawn from the notch of the catch base 9a and rotated by 90° in a direction towards the (non-depicted) typist. The shorter edge of mechanical stop 9 now serves as a mechanical stop 9 of a decreased height h. The mechanical stop 9 now is maintained in the depicted position by means of a force between the first magnet M1 and the second magnet M2. The magnets M1, M2 can be used for holding a magnetizable pin or the like in the constellations depicted in FIG. 8 and FIG. 9.

Figure 10:
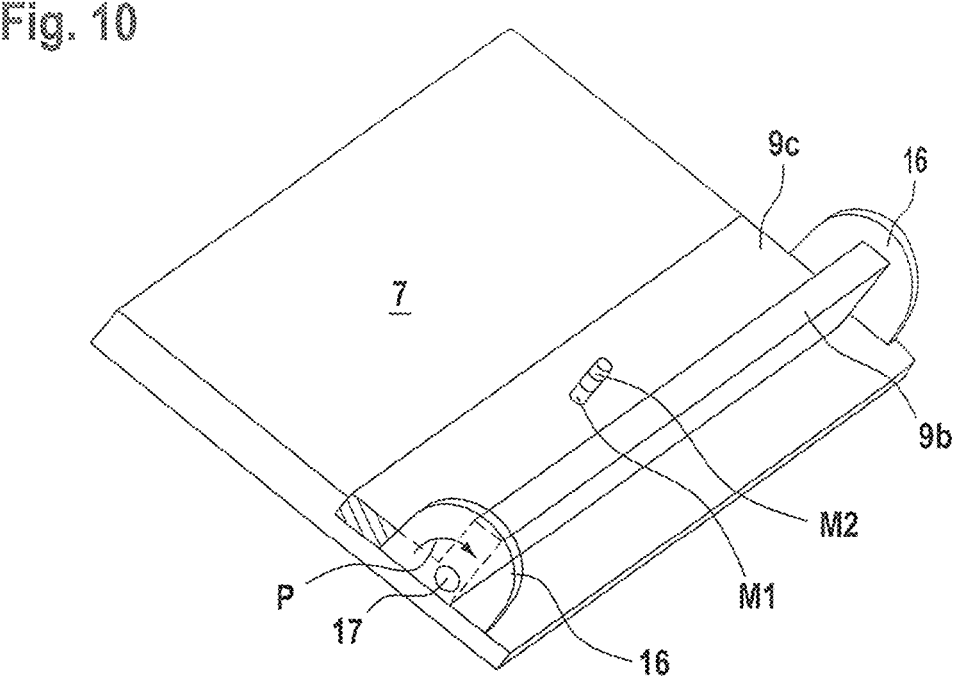
FIG. 10 is a perspective depiction of a support with a rotatable mechanical stop in a first position.

FIG. 10 shows a support 7 in an embodiment with a rotatable mechanical stop 9, which consists of an uneven-sided L-profile and is pivotably supported in cranks 16 via hinges 17 at both ends. A long edge 9a of the mechanical stop 9 is introduced into a corresponding recess in the surface of support 7. The mechanical stop 9 is secured against an unwanted rotation in the direction of arrow P by a magnet M1 arranged in support 7 and a magnet M2 in long edge 9c, which interact with each other. In addition, the weight of a file on support 7 prevents the mechanical stop 9 against an unwanted rotation. In the depicted position, the shorter edge 9b of mechanical stop 9 is active, such that flat copies or thin files, respectively, can be handled in an ergonomic manner.

Figure 11:
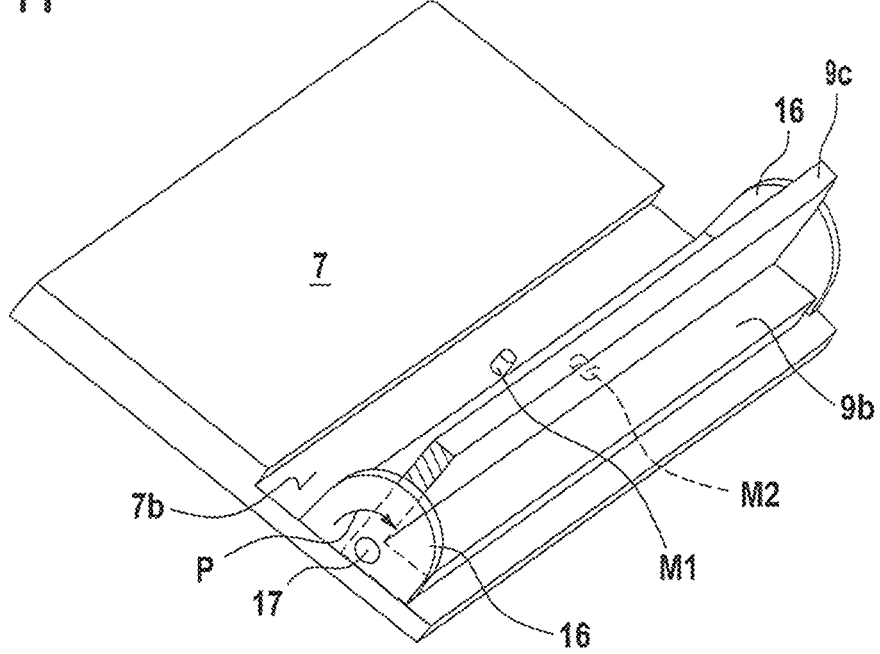
FIG. 11 is a perspective depiction of a support with a rotatable mechanical stop in a second position.

FIG. 11 shows the embodiment of FIG. 10 after a rotation of the mechanical stop 9 in the direction of the arrow P, wherein the magnetic forces between M1 and M2 have to be overcome in order to disconnect them. The short edge 9b stabilizes the mechanical stop 9 by abutting to support 7 against a further rotation, such that now the long edge 9c is active as a mechanical stop and high stacks of copies and thick files, respectively, are ergonomically secured. Revealed recess 7b in support 7 does not hinder the accommodation of files and copies at all, since it only has a depth of the strength of the long edge 9c.

Figure 12:
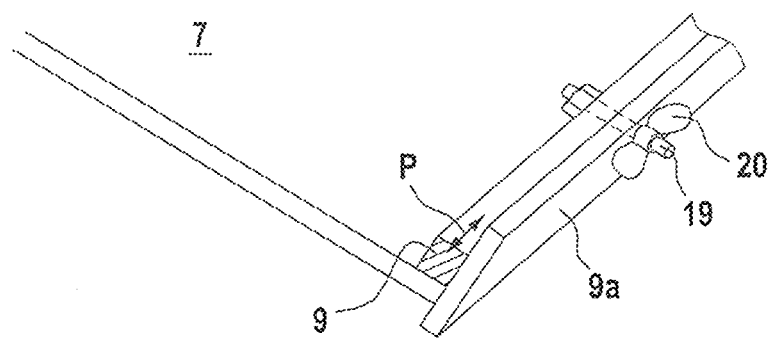
FIG. 12 is a perspective depiction of a support with a stepless adjustable mechanical stop.

FIG. 12 shows an embodiment of support 7 with a stepless height adjustable mechanical stop 9. Therefore, a threaded bolt 19 is provided in mechanical stop 9. Threaded bolt 19 reaches through a long hole in the catch base 9a, which is firmly connected to the support 7, while the long hole is oriented in a perpendicular direction with respect to the length of the mechanical stop 9. A wing nut 20 on the threaded bolt 19 is provided in order to be tightened by hand, if the mechanical stop being pushed in direction of double arrow P has reached the desired height.

Figure 13:
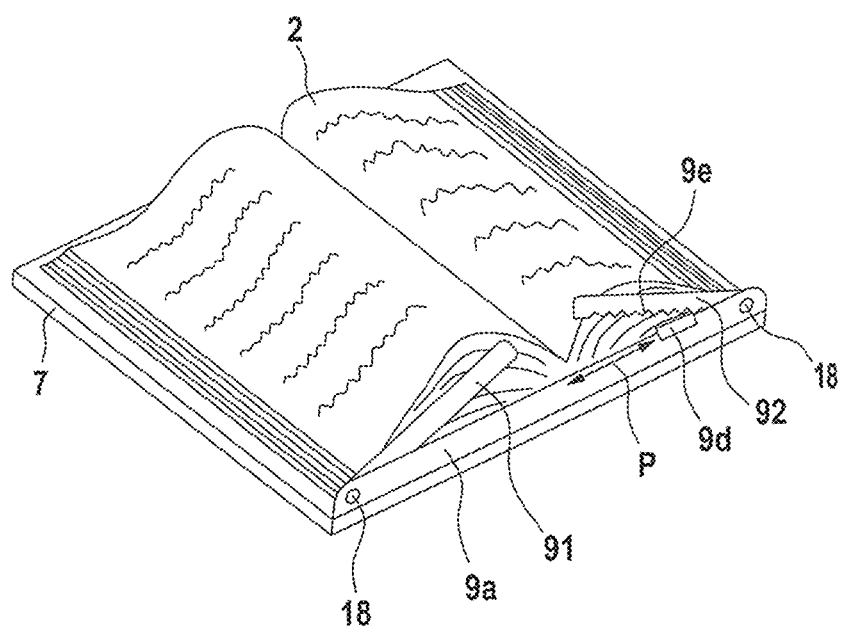
FIG. 13 is a perspective depiction of a support with independently rotatable half stops.

FIG. 13 shows a perspective depiction of a support 7 with dependently rotatable half stops 91, 92 of a mechanical stop 9, which are attached to a catch base 9a in the region of the outer edges of the support 7 via hinges 18. While the left half stop 91 is capable of being adjusted in a stepless manner and due to friction maintains erected exposed, the right half stop 92 rests on a block 9d, which engages a tooth 9e at the lower side of half stop 92. The block 9d is enabled to being pushed in two directions of double arrow P. The roof-type configuration of the half stops 91, 92 imitates a contour of a lower side/front edge of file 2 and maintains good ergonomics when browsing in file 2 at the outer edges of support 7.

Figure 14:
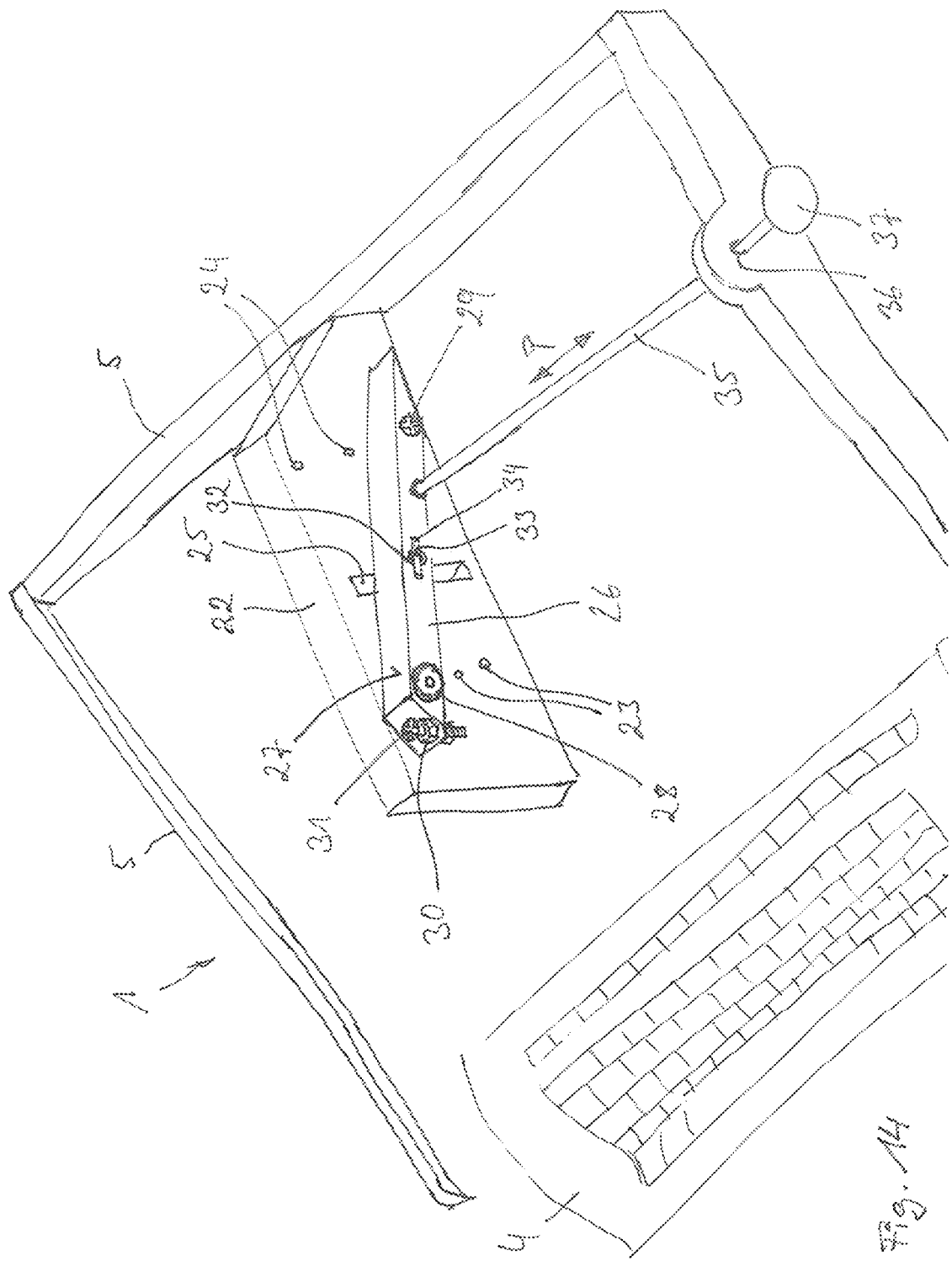
FIG. 14 is a perspective depiction of an embodiment with a centred crank.

FIG. 14 shows an embodiment of an arrangement 1 according to the present invention, in which a crank base body 22 is arranged between a left and a right part of the base 5. The slide and the support are not depicted for the sake of simplicity. The crank base body 22 shows front bores 23 and rear bores 24, which are engaged by a front (longer) pin 28 and a rear (shorter) pin 29, which are stuck through a rail 26. The rail 26 can be adjusted with respect to its inclination, if the pins 28, 29 are engaged with currently spare bores 23, 24. The rail 26 is substantially arranged centred between the left and the right part of the base 5, such that a (non-depicted) wheel member attached to the support can coast on the wheeling surface 27 in order to bring the support into a steep configuration in a front position and into a smooth configuration in a rear position. An elastic band 33 is guided through a cutout 25 in the crank base body 22 and a bore 32 in rail 26 and secured via a splint 34. The elastic band 33 presses the rail 26 towards the crank base body 22, such that the engagement between pins 28, 29 with the bores 23, 24 is secured. By drawing a knob 37 on a pole 35, the latter of which is guided in a guidance 36 in base 5 according to double arrow P, the user can comfortably (partially) disengage the rail 26 and the crank base body 22, adjust the inclination and reengage the rail 26 and the crank base body 22 at a different inclination. A bore with a thread in the form of a nut 30 is provided at a front edge of the rail 26 such that the head of the screw 31 is height adjustably threaded into the nut 30. The head of screw 31 is recessed with respect to wheeling surface 26, such that the (non-depicted) wheeling member height adjustably sinks onto the head of the screw 31 by the end of rail 26. In this manner the (non-depicted) slide of the apparatus 1 is arrested in a front position by means of the gravity of the support/file, in order to facilitate comfortably working in this position.

In addition to the description of the invention above, it is herewith referred to the disclosure of the invention in connection with FIGS. 1 to 14 as additional disclosure.

The invention claimed is:

1. An apparatus for arranging a file above a keyboard which is located on a desk, the apparatus comprising:
   a base;
   a slide;
   an inclined support for supporting the file, wherein the support comprises a mechanical stop disposed at a front edge thereof to secure the file on the support; and
   a position member arranged for a dynamic adjustment of an inclination of the support by at least partially raising the support depending on a position of the slide with respect to the base,
   wherein the support is mounted on the slide,
   wherein the base is adapted to be arranged on the desk and/or on the keyboard and to guide the inclined support above the keyboard during a horizontal motion of the slide with respect to the base from a back position to a front position and vice versa, and
   wherein an arrestor is provided in the front position or in the back position and/or a guide rail is provided between the base and the slide for guiding the horizontal motion.

2. The apparatus according to claim 1, wherein the slide is slidably attached to or on the base.

3. The apparatus according to claim 1, wherein the base has, at least in part, an anti-slip lower surface.

4. The apparatus according to claim 1, wherein the support provides an inclined plane and/or an adjustable inclination with respect to the slide.

5. The apparatus according to claim 1, wherein the mechanical stop has an adjustable height and/or is replaceable and/or rotatable.

6. The apparatus according to claim 1, wherein the base is designed and arranged in order to protrude with respect to the support at a front end before the horizontal motion of the slide with respect to the base from the back position to the front position and not to protrude anymore with respect to the support at the front end after the horizontal motion of the slide with respect to the base from the back position to the front position.

7. The apparatus according to claim 1, wherein the support comprises an extension which extends perpendicularly with respect to a direction of the horizontal motion of the slide with respect to the base from the back position to the front position beyond the base and/or which is arranged to swing out or to be pushed in this direction.

8. The apparatus according to claim 1, wherein the base includes a cavity to accommodate the keyboard therein, and
wherein a clearance between a lower side of the base and the lower side of the support is configured to accommodate the keyboard therein.

9. The apparatus according to claim 8, wherein the clearance is 3 to 6 cm, and an inner width of the cavity of the base is at least 45 cm.

10. An apparatus for arranging a file above a keyboard which is located on a desk, the apparatus comprising:
a base;
a slide; and
an inclined support for supporting the file, wherein the support comprises a mechanical stop disposed at a front edge thereof to secure the file on the support,
wherein the support is mounted on the slide,
wherein the base is adapted to be arranged on the desk and/or on the keyboard and to guide the inclined support above the keyboard during a horizontal motion of the slide with respect to the base from a back position to a front position and vice versa,
wherein an arrestor is provided in the front position or in the back position and/or a guide rail is provided between the base and the slide for guiding the horizontal motion,
wherein the base includes a cavity to accommodate the keyboard therein, and
wherein a clearance between a lower side of the base and the lower side of the support is configured to accommodate the keyboard therein.

11. The apparatus according to claim 10, wherein the clearance is 3 to 6 cm, and an inner width of the cavity of the base is at least 45 cm.

12. The apparatus according to claim 10, wherein the slide is slidably attached to or on the base.

13. The apparatus according to claim 10, wherein the base has, at least in part, an anti-slip lower surface.

14. The apparatus according to claim 10, wherein the support provides an inclined plane and/or an adjustable inclination with respect to the slide.

15. The apparatus according to claim 10, wherein the mechanical stop has an adjustable height and/or is replaceable and/or rotatable.

16. The apparatus according to claim 10, wherein the base is designed and arranged in order to protrude with respect to the support at a front end before the horizontal motion of the slide with respect to the base from the back position to the front position and not to protrude anymore with respect to the support at the front end after the horizontal motion of the slide with respect to the base from the back position to the front position.

17. The apparatus according to claim 10, wherein the support comprises an extension which extends perpendicularly with respect to a direction of the horizontal motion of the slide with respect to the base from the back position to the front position beyond the base and/or which is arranged to swing out or to be pushed in this direction.

\* \* \* \* \*